United States Patent [19]

Kassai

[11] Patent Number: 4,479,665
[45] Date of Patent: Oct. 30, 1984

[54] MECHANISM FOR CHANGING THE DIRECTION OF PUSHER ROD MEANS OF A BABY CARRIAGE

[75] Inventor: Kenzou Kassai, Osaka, Japan
[73] Assignee: Kassai Kabushikikaisha, Osaka, Japan
[21] Appl. No.: 423,696
[22] Filed: Sep. 27, 1982
[30] Foreign Application Priority Data Oct. 26, 1981 [JP] Japan ............................ 56-172617

[51] Int. Cl.³ ............................................ B62B 7/06
[52] U.S. Cl. ................................ 280/644; 280/47.36; 297/183; 403/92; 403/99
[58] Field of Search .................... 292/263; 403/92, 93, 403/99, 106; 297/183; 280/644, 47.36, 642, 650, 47.34

[56] References Cited

U.S. PATENT DOCUMENTS

| | | | |
|---|---|---|---|
| 1,488,224 | 3/1924 | Anderson | 403/93 |
| 2,718,407 | 9/1955 | Welsh | 280/47.36 |
| 2,726,876 | 12/1955 | Boudreau | 280/47.36 |
| 4,428,598 | 1/1984 | Kassai | 280/644 |

FOREIGN PATENT DOCUMENTS 400652 12/1942 Italy ................................ 280/47.36
115714 1/1946 Sweden ............................ 280/47.36

Primary Examiner—Joseph F. Peters, Jr.
Assistant Examiner—Michael Mar
Attorney, Agent, or Firm—W. G. Fasse; D. H. Kane, Jr.

[57] ABSTRACT

The present baby carriage has a pusher rod (2) which can be pivoted to selectively assume a back-fronting push position or a face-fronting push position with respect to the baby sitting in the baby carriage. A mechanism for changing the direction of the pusher rod (2) comprises a slider (5) slidably mounted on the pusher rod (2), a connecting member (37) having a predetermined length, its opposite ends being pivotally connected to the slider (5) and the upper end of a front leg (16), respectively, a stopper (42) mounted to be slidable along the longitudinal direction of the connecting member (37), and a stop plate (50) formed with first and second recesses (51, 52) engageable with one end (47) of the stopper (42) at different positions on its circumferential surface and fixedly mounted on the upper end of the front leg (16). The direction of the connecting member (37) is changed back and forth with respect to the upper end of the front leg (16) in response to the engagement of the stopper (42) with either the first recess (51) or the second recess (52), whereby the pusher rod (2) at its changed position is fixed.

13 Claims, 5 Drawing Figures

MECHANISM FOR CHANGING THE DIRECTION OF PUSHER ROD MEANS OF A BABY CARRIAGE

BACKGROUND OF THE INVENTION

1. Field of the Invention

The present invention relates to a mechanism for changing the direction of the pusher rods in a baby carriage, whereby either a so-called back-fronting push mode in which the person pushes the baby carriage facing the back of the baby in the baby carriage or a so-called face-fronting push mode in which the person pushes the baby carriage viewing the face of the baby can be selectively attained.

2. Description of the Prior Art

Heretofore, there have been two types of baby carriages, the back-fronting push type and the face-fronting push type. The selection of one or the other of these types depends on taste and on safety. Usually, the face-fronting push type is used for younger babies and the back-fronting push type for older babies.

It would be more convenient if the selection of the back-fronting push mode or face-fronting push mode could be made on a single baby carriage. Therefore, baby carriages constructed to be capable of selectively providing these two modes have been proposed.

However, it is required that the baby carriage be light in weight and simple in construction. Further, it is also an important requirement that the baby carriage has sufficient strength and durability. Therefore, it would be important to incorporate a mechanism which selectively provides the back-fronting push mode and the face-fronting push mode while satisfying these additional requirements.

On the other hand, collapsible baby carriages are very convenient in connection with the use of transport facilities and have been widely used. In such collapsible baby carriages, the incorporation of a mechanism for providing collapsibility while satisfying the above described requirements including simple construction would encounter difficulties in design. Under these circumstances, the addition of a mechanism for selectively providing the back-fronting and face-fronting push modes would cause inconveniences including a more complicated construction.

SUMMARY OF THE INVENTION

From the foregoing description, it will be understood that a mechanism for selectively providing the back-fronting and face-fronting push modes to be incorporated in a baby carriage should satisfy the requirement that the arrangement be simple and, nevertheless, be capable of securely achieving one or the other of the above described modes as desired. This invention satisfies such requirement or desire.

In brief, the present invention relates to a mechanism for changing the direction of the pusher rods in a baby carriage in which the pusher rods are pivotally supported about a first fixed point on the body of the baby carriage, the direction of the pusher rods being changed in accordance with forward and rearward turning of the pusher rod itself, and said pusher rods comprise a pair of slide guide rods extending relatively vertically. The mechanism for changing the direction of the push rods comprises a slider slidably guided on each slide guide rod of said pusher rod, a connecting member having a predetermined length, its opposite ends being pivotally connected to said slider and a second fixed point on the body of the baby carriage, respectively, a stopper mounted to be slidable along the longitudinal direction of said connecting member, and a stop plate formed with first and second recesses engageable with one end of said stopper at different positions back and forth on its circumferential surface, and fixedly mounted to said second fixed point. In this arrangement, the direction of the connecting member can be changed back and forth with respect to the second fixed point in response to the engagement of the stopper with either the first recess or the second recess, whereby the pusher rods are fixed in the changed position.

In a preferred embodiment of the invention, the stopper is urged toward the stop plate by a spring. Further, the stopper is formed with an operating knob. The connecting member comprises a tube portion in which the stopper is received to slide in the longitudinal direction of the connecting member. The spring is a compression spring and is inserted in the connecting member while the force of the spring is exerted on both of the connecting member and the stopper.

Another preferred embodiment of the invention is directed to a foldable baby carriage comprising a pair of forwardly downwardly extending front legs, a pair of rearwardly downwardly extending rear legs pivotally connected at their upper ends to said front legs, a pair of support angle bars pivotally connected at their one ends to the middle regions of said rear legs, and a pair of transverse connecting rods for operatively connecting said front legs and said support angle bars together, one of said front legs, one of said rear legs and one of said transverse connecting rods constituting one lateral surface forming structure, the other front leg, rear leg and transverse connecting rod constituting the other lateral surface forming structure, with connecting rods horizontally extending between said one lateral surface forming structure and said other lateral surface forming structure. The slide guide rods of the pusher rods are pivotally connected at their lower ends to the support angle bars. The connecting members are pivotally connected between the front legs and the slide guide rods which are slidably fitted on the slide guide rods.

Accordingly, a principal object of the present invention is to provide a mechanism for selectively providing the back-fronting and face-fronting push modes by a simpler yet reliable arrangement.

Another object of the present invention is to provide a mechanism in which the selection of such back-fronting and face-fronting push modes can be made by a simple operation.

These and other objects and features of the present invention will become more apparent from the following detailed description when taken in conjunction with the accompanying drawings.

DESCRIPTION OF THE PREFERRED EMBODIMENTS

Figure 1:
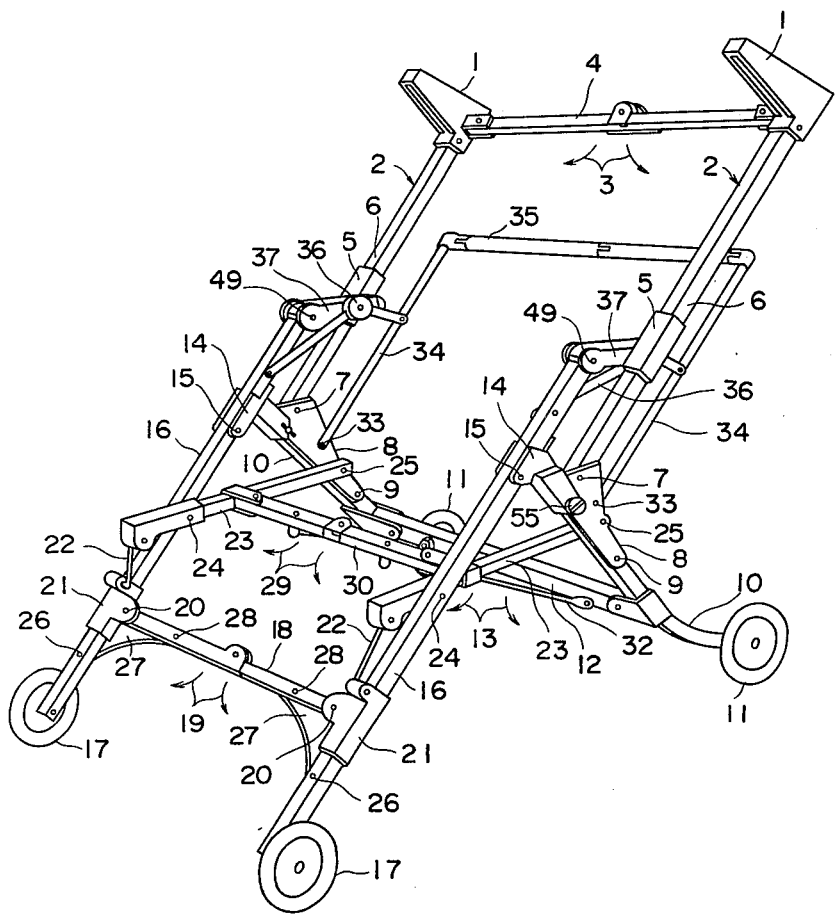
FIG. 1 is a perspective view of a baby carriage in its opened state, in which an embodiment of the present invention is adopted.
Figure 2:
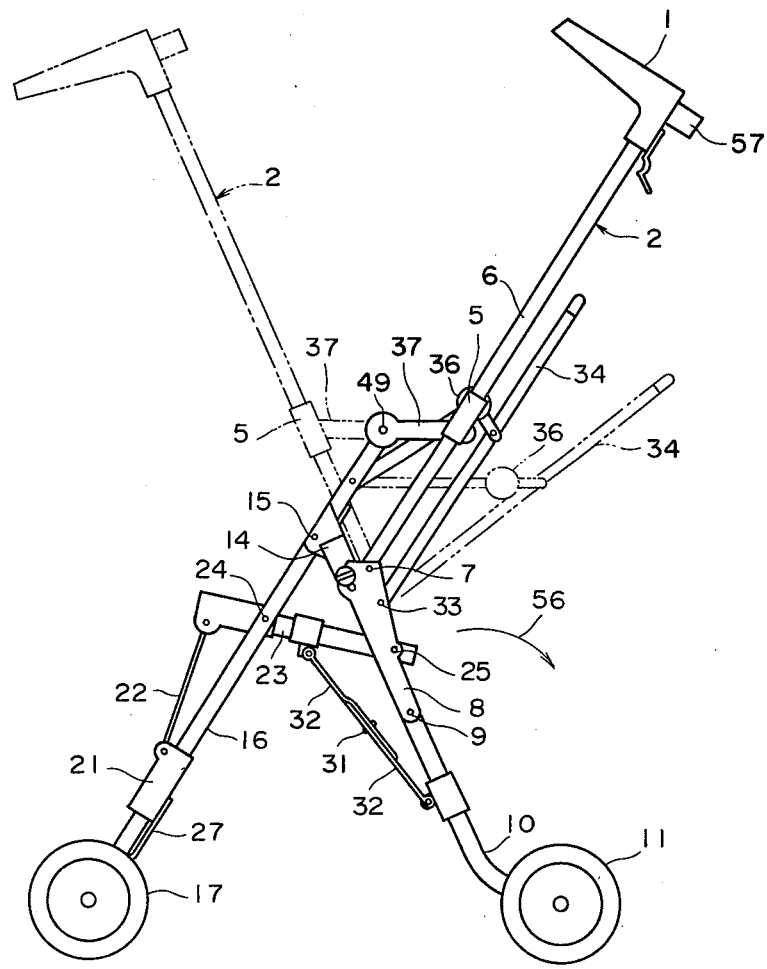
FIG. 2 is a right-hand side view of the baby carriage of FIG. 1 in its opened state.
Figure 3:
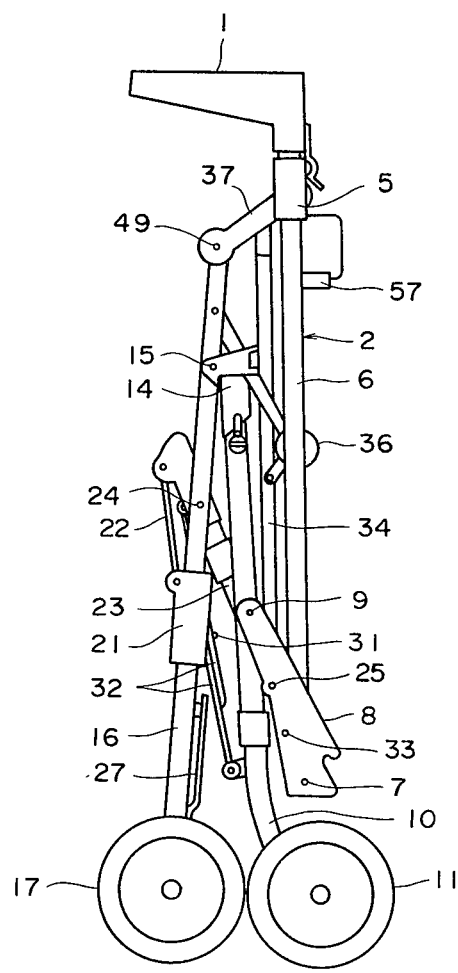
FIG. 3 is a right-hand side view of the baby carriage of FIGS. 1 and 2 in its closed state.

Referring to FIGS. 1 to 3, a baby carriage embodying the present invention is shown. The illustrated baby carriage is similar in its structure to a baby carriage disclosed in Japanese Patent Application No. 118,727/1982 filed by the same applicant as in the present application. The above referenced Japanese patent application corresponds to U.S. patent application Ser. No. 398,667 now U.S. Pat. No. 4,428,598, British Patent Application No. 8221618, German Patent Application No. P32 27 674.5, French Patent Application No. 82 13102, Australian Patent Application No. 86301/82 and Formosan U.M. Application No. 7123937.

Handles 1 for moving the baby carriage are installed on the upper ends a pair of pusher rods 2. The pusher rods 2 comprise a pair of rods arranged in parallel with each other in this example embodiment. The upper ends of the pusher rods are connected by a pusher rod connecting rod 4 which is foldable in the direction of arrows 3. The intermediate portion of each pusher rod 2 is formed with a slide guide rod 6 slidably guiding a slider 5. The lower ends of the pusher rods 2 are pivotally connected to support angle bars 8 through pivot pins 7. The support angle bars 8 are connected to rear legs 10 by pivot pins 9. Rear wheels 11 are installed at the lower ends of the rear legs 10, respectively. The pair of rear legs 10 are connected together by a rear leg connecting rod 12. The rear leg connecting rod 12 is foldable in the direction of arrows 13 at its intermediate portion. Brackets 14 are attached to the upper ends of the rear legs 10. The brackets 14 are pivotally installed on front legs 16 by pivot pins 15. The shape or design of each bracket 14 is so selected as to position the respective front legs 16 inside each plane on which each pusher rod 2 and each rear leg 10 are positioned. Front wheels 17 are installed at the lower ends of the front legs 16. The front legs are connected together by a front leg connecting rod 18. The front leg connecting rod 18 is foldable in the direction of arrows 19.

The related arrangement between the front leg connecting rod 18 and the front legs 17 will now be described. The opposite ends of the front leg connecting rod 18 are pivotally connected to front leg sliders 21 through pivot pins 20. The front leg sliders 21 are slidably mounted on the front legs 16. One end of each bar link 22 is connected to the associated front leg slider 21. The other end of each bar link 22 is connected to the forward end of each transverse connecting rod 23. The transverse connecting rods 23 are connected to the front legs by pivot pins 24 and are connected to the support angle bars 8 by pivot pins 25. One end of the arms 27 are pivotally connected to the front legs 16 through pivot pins 26. The other ends, i.e. the inside ends, of the arms 27 are pivotally connected to the front leg connecting rod through pivot pins 28 at the positions spaced a predetermined distance apart from the opposite ends of the front leg connecting rod 18.

The pair of transverse connected rods 23 are connecting together by a central laterally connecting rod 30 which is foldable in the direction of arrows 29. A pair of interlocking links 32 crossing each other in X-shape and pivotally connected together by a pivot pin 31 are pivotally connected between the central laterally connecting rod 30 and the rear leg connecting rod 12. It is preferable that the interlocking links 32 and the central laterally connecting rod 30 and rear leg connecting rod 12 be connected together in a universal joint fashion.

Backrest retaining frames 34 are connected to the support angle bars 8 through pivot pins 33. The upper ends of the pair of backrest retaining frames 34 are connected together by a foldable backrest connecting rod 38. These backrest retaining frames 34 and backrest connecting rods 35 are provided for retaining the backrest of a hammock (not shown) on which to place a baby. The seat of the hammock is attached on the transverse connecting rods 23 and central laterally connecting rod 30 by utilizing these members. The backrest retaining frames 34 may be arranged so that the reclined state thereof can be adjusted by reclining adjusting members 36 which are connected and installed between the backrest retaining frames 34 and the front legs 16.

Figure 4:
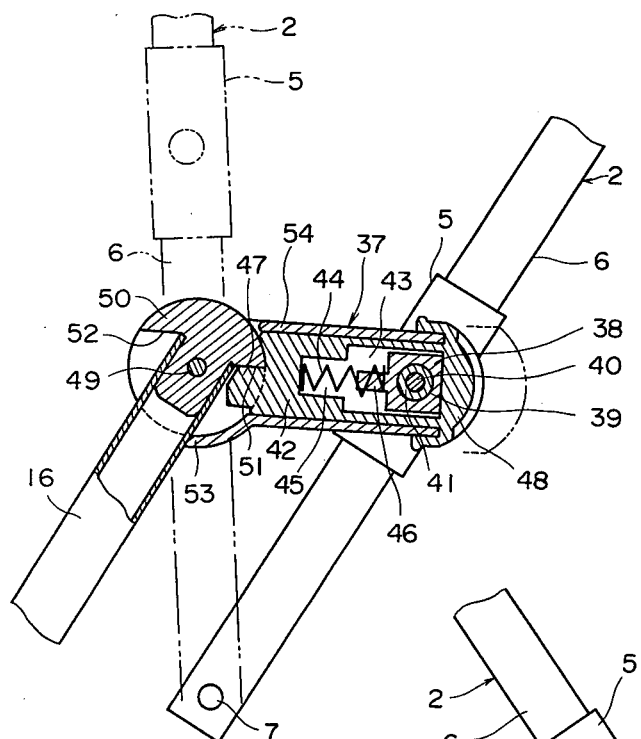
FIG. 4 is a right-hand side view, partly in section, showing principal portions of the baby carriage of FIGS. 1 and 2.
Figure 5:
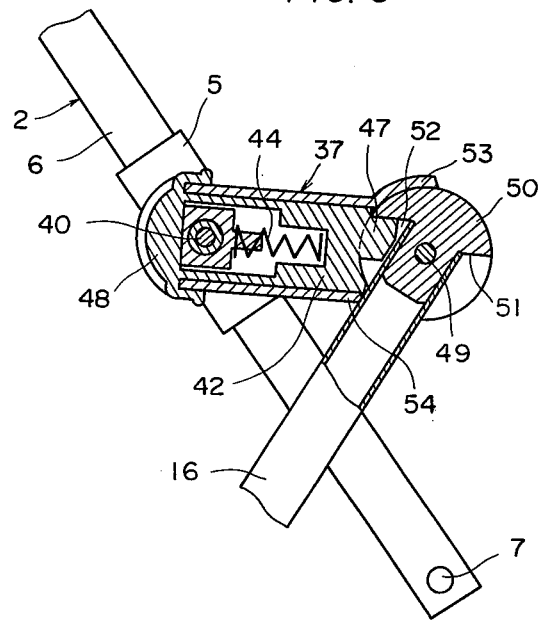
FIG. 5 is a right-hand side view showing the state in which the direction of the pusher rods is changed by the mechanism shown in FIG. 4.

The portion in which the embodiment of the present invention is embodied will now be described in more detail. Referring to FIGS. 4 and 5, the embodiment comprises means connected between the upper ends of front legs 16 and the sliders 5, for example. It is clear from the foregoing description that the pusher rods 2 are pivotally supported forwardly and rearwardly by the pivot pins 7, which form a first fixed point on the body of the baby carriage, on the support angle bars 8 constituting a part of the body of the baby carriage. However, means for fixing the direction of the pusher rods 2 have not been described yet.

The mechanism for changing the direction of the pusher rods 2 according to the invention comprises a second fixed point in addition to the first fixed point realized by the above described pivot pins 7 on the body of the baby carriage. The second fixed point is located, for example, at the upper end of each front leg 16.

Referring to FIG. 4, one end of a connecting member 37 is pivotally connected to the associated slider 5. More specifically, the connecting member 37 comprises a block 38 quadrangular in section and having an aperture 39. On the other hand, a pin 40 is disposed on the slider 5 and laterally extends from the lateral surface of the slider 5, and a sleeve 41 is arranged about the pin 40. The pin 40 runs through the aperture 39 with the sleeve 41 being interposed therebetween, whereby the connecting member 37 is pivotally connected to the slider 5. The connecting member 37 is a tube and receives a stopper 42 in the internal space thereof. The stopper 42 is slidable in the longitudinal direction of the connecting member 37. The stopper 42 is formed with a groove or channel 43 to allow the stopper 42 to slide through a predetermined distance and direction with respect to the block 38 which is received within the groove 43. A compression spring 44 is arranged in the groove 43 and retained between a concavity 45 formed on the stopper 42 and a convexity 46 formed on the stopper 42. The stopper 42 is provided with an engaging portion 47 of a projection shape at one end thereof. Further, the other end of the stopper 42 is projected from one end of the connecting member 37 to form an operating knob 48. The other end of the connecting member 37 is pivotally connected to the front leg 16 by a pivot pin 49 forming a second fixed point on the body of the baby carriage, mounted on the upper end of each front leg 16. A stop plate 50 is secured on the upper end of the front leg 16. The stop plate 50 has first and second recesses 51 and 52 selectively engagable with the engaging portion 47 of the stopper 42 at different positions back and forth on its circumferential surface with its center at the pivot pin 49 on the stop plate 50.

The state of the pusher rod 2 shown in solid lines in FIG. 4 corresponds to the state of the pusher rod 2 in solid lines shown in FIG. 2. That is, the state is of a back-fronting push mode. In this state, because the end 53 of the connecting member 37 abuts against the front leg 16, the connecting member 37 is inhibited from turning in the clockwise direction around a pivot pin 49, and the turning of the connecting member 37 in the counterclockwise direction is inhibited because of the engagement of the engaging portion 47 with the first recess 52. That is, the connecting member 37 is in the fixed state with respect to the front leg 16. Accordingly, through the slider 5, the pusher rod 2 is maintained in the position in which it is tilted to the back of the stop plate 50.

In order to change such back-fronting push mode to a face-fronting push mode, the following operations will be involved. First, the operating knob 48 of the stopper 42 is pulled rearwardly, whereby the stopper 42 is moved against the resilience of the compression spring 44, and then the engaging portion 47 comes out of the first recess 51. While this state is maintained, the pusher rod 2 is tilted forwardly. While such operation is proceeding, the slider 5 temporarily slides upwardly on the slide guide rod 6 as shown in phantom lines in FIG. 4, and when the pusher rod 2 is further tilted forwardly, the slider 5 then slides downwardly. In the course of this operation, the force of pulling the operating knob 48 need not be maintained, because the engaging portion 47 is moved along the circumferential surface of the stop plate 50. When the pusher rod 2 is completely tilted forwardly, the state shown in FIG. 5 is established.

The state of the pusher rod 2 shown in FIG. 5 corresponds to the state of the pusher rod 2 shown in phantom lines in FIG. 2. That is, a face-fronting push mode is established. As described above, when the engaging portion 47 reaches the position of the second recess 52 after its slide along the circumferential surface of the stop plate 50, the engaging portion 47 is automatically engaged with the second recess 52 under the action of the compression spring 44. In the state shown in FIG. 5, the end 57 of the connecting member 37 abuts against the front leg 16, and the connecting member 37 is inhibited from turning in the counterclockwise direction around the pivot pin 49. Further, the turning of the connecting member 37 in the clockwise direction around the pivot pin 49 is inhibited because of the engagement of the engaging portion 47 with the second recess 52. Accordingly, the connecting member 37 is fixed in the state in which it is directed to the front of the stop plate 50. Therefore, the pusher rod 2 is maintained in its forwardly tilted state by the slider 5.

For changing from such face-fronting push mode to the back-fronting push mode again, the operation is initiated by pulling the operating knob 48, in the same way described about but in the reverse mode, and then the pusher rod 2 is tilted rearwardly, whereby the state shown in FIG. 4 is automatically established.

The mechanism for changing the direction of the pusher rods 2 which has been so far described can be applied to not only the baby carriage shown in FIGS. 1 to 3 but also any other baby carriages comprising a first fixed point on which the pusher rods are pivotally secured to the body of the baby carriage and a second fixed point for attaching the stop plate. For example, although the baby carriage shown in FIGS. 1 to 3 is of a collapsing type, the present invention can also be applied to baby carriages without any collapsing features.

The opening and closing operations of the baby carriage shown in FIGS. 1 to 3 will now be described. In the opened state of the baby carriage, the support angle bars 8 are aligned with the rear legs 10 and fixed to the brackets 14 by a locking mechanism 55. One example of the locking mechanism 55 is disclosed in the above referenced Japanese patent application filed by the same applicant as in the present application.

For changing from such opened state to the closed state, first, it is necessary to first put the pusher rods 2 into the position of the back-fronting push mode shown in FIG. 4. In addition, it should be pointed out that such operation is necessary only for the baby carriage illustrated herein and, therefore, for baby carriages of other types, there are certain instances in which that operation may not be necessary or in which it may be necessary to oppositely change the pusher rods into a face-fronting push mode. In that position, the locking mechanism 55 is unlocked. Subsequently, the baby carriage is lifted above the ground by the hands holding the grips 1, whereupon the support angle bars 8 turn in the direction of arrow 56 (FIG. 2). Next, with the rear wheels 11 held in contact with the ground, the baby carriage is rearwardly tilted to lift the front wheels 17 and the grips 1 are then depressed. If the forces for depressing the grips 1 are exerted through the intermediary of an operating portion 57 provided at the center of the pusher rod connecting rod 4, the holding of the pusher rod connecting rod 4 in the direction of arrows 3 will take place advantageously. While such operation is proceeding, the pusher rods 2 are brought to their lower position with respect to the rear legs 10 and the sliders 5 slide upwardly on the slide guide rods 6. In response thereto, the transverse connecting rods 23 are turned so that their front ends are upwardly directed, and the front leg sliders 21 slide upwardly on the front legs 16 under the tension of the bar links 22. In response thereto, the front leg connecting rod 18 is folded in the direction of arrows 19, because the front leg connecting rod 18 is connected to the arms 27 at the pivot pins 28. This folding of the front leg connecting rod 18 causes the front legs 16 to move toward each other. Further, concurrently therewith, the following movements take place: the movement of the pair of pusher rods 2 toward each other, the movement of the pair of rear legs 10 toward each other, the movement of the backrest retaining frames 34 toward each other and the movement of the rear legs 10 toward the front legs 16. According to the movement of the rear legs 10 toward the front legs 16, the rear leg connecting rod 12 and the central laterally connecting rod 30 move toward each other and are folded in the directions of arrows 13 and 29, respectively, under the action of the interlocking links 32. Finally, as shown in FIG. 3, the front legs 10 stand substantially parallel with the pusher rods 2 and the rear legs 14 also stand substantially parallel with the pusher rods 2. And the right and left members move toward each other. In this manner, the closed state of the baby carriage is obtained.

The closed state may be locked by the locking mechanism 55. In the state shown in FIG. 3, the two front wheels 17 and the two rear wheels 11 are substantially on the same level, and the baby carriage is capable of standing by itself in its closed state.

For a change from the closed state to the opened state, if necessary, first, the locking of the locking mechanism 55 is canceled. Next, the entire body of the baby carriage may be lifted in the air by holding the operating portion 57, for example, provided at the pusher rod connecting rod 4. In response thereto, the weight of the baby carriage works by turning the support angle bars 8 around the axis of the pivot pins 7 at the lower ends of the pusher rods 2. Concurrently therewith, the front leg connecting rod 18 is straightened to separate the front legs 16 from each other. Substantially at the same time, the rear legs 10 are turned away from the front leg 16. In response thereto, the rear leg connecting rod 12 and central laterally connecting rod 30 are straightened into an interlocking relation by the action of the interlocking links 32. In such operation, the pair of pusher rods 2, the pair of rear legs 10 and the pair of transverse connecting rods 23 move to expand widthwise, the transverse connecting rods 23 are brought into the horizontal state, and finally the opened state is established. In this opened state, if the locking mechanism 55 is exerted, the opened state shown in FIGS. 1 and 2 is maintained.

As described above the application of the present invention is not limited to such baby carriage. For example, without any substantial change of the construction of the illustrated mechanism, the present invention can also be applied to a baby carriage which differs from the illustrated baby carriage only in that the former has no collapsing function for widthwise contraction. More specifically, the baby carriage comprises the pusher rod connecting rod 4, rear leg connecting rod 12, front leg connecting rod 18 and so on which are constituted of integral rods, respectively. Further, the mechanism shown in FIGS. 4 and 5 can also be adopted, without any substantial change of design, in a baby carriage which has no collapsing scheme and is similar to the illustrated baby carriage only in the framework thereof.

In addition, in the above described embodiment, the compression spring 44 is provided for urging the stopper 42 toward the stop plate 50. However, such compression spring is not always necessary. For example, in the case where the compression spring 44 is not provided, both the pull and push of the operating knob 48 may be manually operated.

Further, each shape of the recesses 51 and 52 formed on the stop plate 50 and the engaging portion 47 formed on the stopper 42 may be arbitrarily changed to any other form. In brief, the condition in which the same allows the connecting member 37 to be fixed to the stop plate 50 at two different positions suffices for this purpose.

Although the present invention has been described and illustrated in detail, it is to be understood that the same is by way of illustration and example only and is not to be taken by way of limitation, the spirit and scope of the present invention being limited only by the terms of the appended claims.

What is claimed is:

1. A mechanism for changing the direction of pusher rod means (2) of a baby carriage, said pusher rod means (2) being pivotally supported by a first fixed point (7) on the body of the baby carriage, the direction of the pusher rod means (2) being changed by a forward and rearward turning thereof, said pusher rod means (2) comprising a pair of slide guide rods (6) extending relatively vertically, said mechanism comprising: a slider (5) slidably guided on each said slide guide rod (6) of said pusher rod means (2), a connecting member (37) having a predetermined length, its opposite ends being pivotally connected to said slider (5) and a second fixed point (49) on the body of the baby carriage, respectively, a stopper (42) mounted to be slidable along the longitudinal direction of said connecting member (37), and a stop plate (50) formed with first and second recesses (51) and (52) engagable with one end (47) of said stopper (42) at different positions back and forth on its circumferential surface, and fixedly mounted to said second fixed point (49), the direction of the connecting member (37) being changed back and forth with respect to the second fixed point (49) in response to the engagement of the stopper (42) with either the first recess (51) or the second recess (52), whereby the pusher rod means (2) at its changed position is fixed.

2. A mechanism in accordance with claim 1, further comprising a spring (44) for urging said stopper 42 toward said stop plate (50).

3. A mechanism in accordance with claim 1, wherein each said recess (51, 52) prevents said connecting member (37) from turning upwardly with its center at said second fixed point (49) when each said recess (51, 52) is engaged with said stopper (42).

4. A mechanism in accordance with claim 3, wherein said connecting member (37) comprises end portions (53 and 54) abutting against predetermined elements on the body of the baby carriage for inhibiting the connecting member (37) from turning downwardly with its center at said second fixed point (49) when each said recess (51, 52) is engaged with said stopper (42).

5. A mechanism in accordance with claim 1, wherein said stopper (42) comprises an operating knob (48).

6. A mechanism in accordance with claim 1, wherein said connecting member (37) comprises a tube portion in which said stopper (42) is slidably received.

7. A mechanism in accordance with claim 2, wherein said connecting member (37) comprises a block (38) provided at the portion pivotally connected to said slider (5), and said stopper (42) is formed with a groove (43) for receiving said block (38) to allow the stopper (42) to slide through a predetermined length with respect to the block (38).

8. A mechanism in accordance with claim 7, wherein said spring (44) is a compression spring disposed within said groove (43) for exerting its force on both said stopper (42) and said block (38).

9. A mechanism in accordance with claim 8, wherein the opposite ends of said compression spring (44) are retained by a concavity (45) formed on said stopper (42) and a convexity (46) formed on said block (38), respectively.

10. A baby carriage comprising: a pair of forwardly downwardly extending front legs (16), a pair of rearwardly downwardly extending rear legs (10) pivotally connected at their upper ends (14) to said front legs (16), a pair of support angle bars (8) pivotally connected at their one ends (9) to the middle regions of said rear legs (10), pusher rod means (2) pivotally connected at their lower ends to the other ends (7) of said support angle bars (8), said pusher rod means (2) comprising a pair of slide guide rods (6) extending relatively vertically, a pair of sliders (5) slidably guided on said respective slide guide rods (6) of said pusher rod means (2), a pair of connecting members (37) having a predetermined length, their opposite ends being pivotally connected to said sliders (5) and said front legs (16), respectively, a pair of stoppers (42) mounted to be slidable along each longitudinal direction of said connecting members (37), a pair of stop plates (50) each formed with first and second recesses (51 and 52) engageable with one end of each said stopper (42) at different positions back and forth on its circumferential surface, said stop plates being fixedly mounted to said associated front leg (16), and a pair of transverse connecting rods (23) for operatively connecting said front legs (16) and said support angle bars (8) together, one of said front legs (16), one of said rear legs (10), one of said slide guide rods (6) and one of said transverse connecting rods (23) constituting one lateral surface forming structure, the other front leg (16), rear leg (10), slide guide rod (6) and transverse connecting rod (23) constituting the other lateral surface forming structure, with connecting rods (4, 12, 18, 30) horizontally extending between said one lateral surface forming structure and said other lateral surface forming structure, the direction of the connecting members (37) being changed back and forth with respect to said stop plates (50) in response to the engagement of each said stopper (42) with either each said first recess (51) or each said second recess (52), whereby the pusher rod means (2) are fixed in the changed position.

11. A baby carriage in accordance with claim 10, wherein said connecting rods (4, 12, 18, 30) are foldable.

12. A baby carriage in accordance with claim 11, wherein said connecting rods include a front leg connecting rod (18) extending between said pair of front legs (16), and which further comprises a pair of front leg sliders (21) fitted on the middle regions of said pair of front legs (16) so that they are slidable lengthwise of the front legs (16), 'a pair of bar links (22) connected between said pair of front leg sliders (21) and the front ends of said pair of transverse connecting rods (23), and a pair of arms (27) inwardly extending from said pair of front legs (16) and pivotally connected thereto, said front leg connecting rod (18) being foldable at the middle and being pivotally connected at its opposite ends to said front leg sliders (21) and to said arms (27) at pivot points (28) each spaced a predetermined distance apart from the associated end of the front leg connecting rod (18).

13. A baby carriage in accordance with claim 11, wherein said connecting rods include:

a rear leg connecting rod (12) relatively downwardly foldable at the middle and pivotally connected at its opposite ends to the lower portions of said pair of rear legs (10), and a central laterally connecting rod (30) relatively forwardly foldable at the middle and pivotally connected at its opposite ends to the middle regions of said pair of transverse connecting rods (23), and said baby carriage further including interlocking links (32) connected between said rear leg connecting rod (12) and said central laterally connecting rod (30).

* * * * *